(12) United States Patent
Wang et al.

(10) Patent No.: US 7,995,828 B2
(45) Date of Patent: Aug. 9, 2011

(54) SPECKLE REPORTING IN DIGITAL RADIOGRAPHIC IMAGING

(75) Inventors: Xiaohui Wang, Pittsford, NY (US);
Jacquelyn S. Ellinwood, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 794 days.

(21) Appl. No.: 11/959,805

(22) Filed: Dec. 19, 2007

(65) Prior Publication Data

US 2009/0161980 A1 Jun. 25, 2009

(51) Int. Cl.
*G06K 9/00* (2006.01)
*B41M 5/00* (2006.01)
(52) U.S. Cl. .......................... 382/132; 382/264; 378/28
(58) Field of Classification Search .................. 382/100, 382/128, 129, 130, 131, 132, 134, 162, 168, 382/172, 181, 232, 254, 260, 264, 274, 276, 305, 312, 275; 356/477; 715/764; 378/28
See application file for complete search history.

(56) References Cited

U.S. PATENT DOCUMENTS

| | | | | |
|---|---|---|---|---|
| 5,627,918 A * | 5/1997 | Carasso | ........................ | 382/254 |
| 5,841,889 A * | 11/1998 | Seyed-Bolorforosh | ....... | 382/128 |
| 6,385,332 B1 * | 5/2002 | Zahalka et al. | ............... | 382/128 |
| 6,421,454 B1 * | 7/2002 | Burke et al. | .................. | 382/131 |
| 6,879,735 B1 * | 4/2005 | Portniaguine et al. | ........ | 382/275 |
| 7,366,992 B2 * | 4/2008 | Thomas, III | .................. | 715/764 |
| 7,847,949 B2 * | 12/2010 | Tearney et al. | ............... | 356/477 |

* cited by examiner

*Primary Examiner* — Seyed Azarian

(57) ABSTRACT

A method for reporting image quality obtains a digital radiological image and processes the image to detect at least one speckle. Noise signal magnitude in the digital radiological image is estimated. At least one speckle is identified according to its signal magnitude relative to the noise signal estimate. The at least one speckle detected in the image is reported.

17 Claims, 5 Drawing Sheets

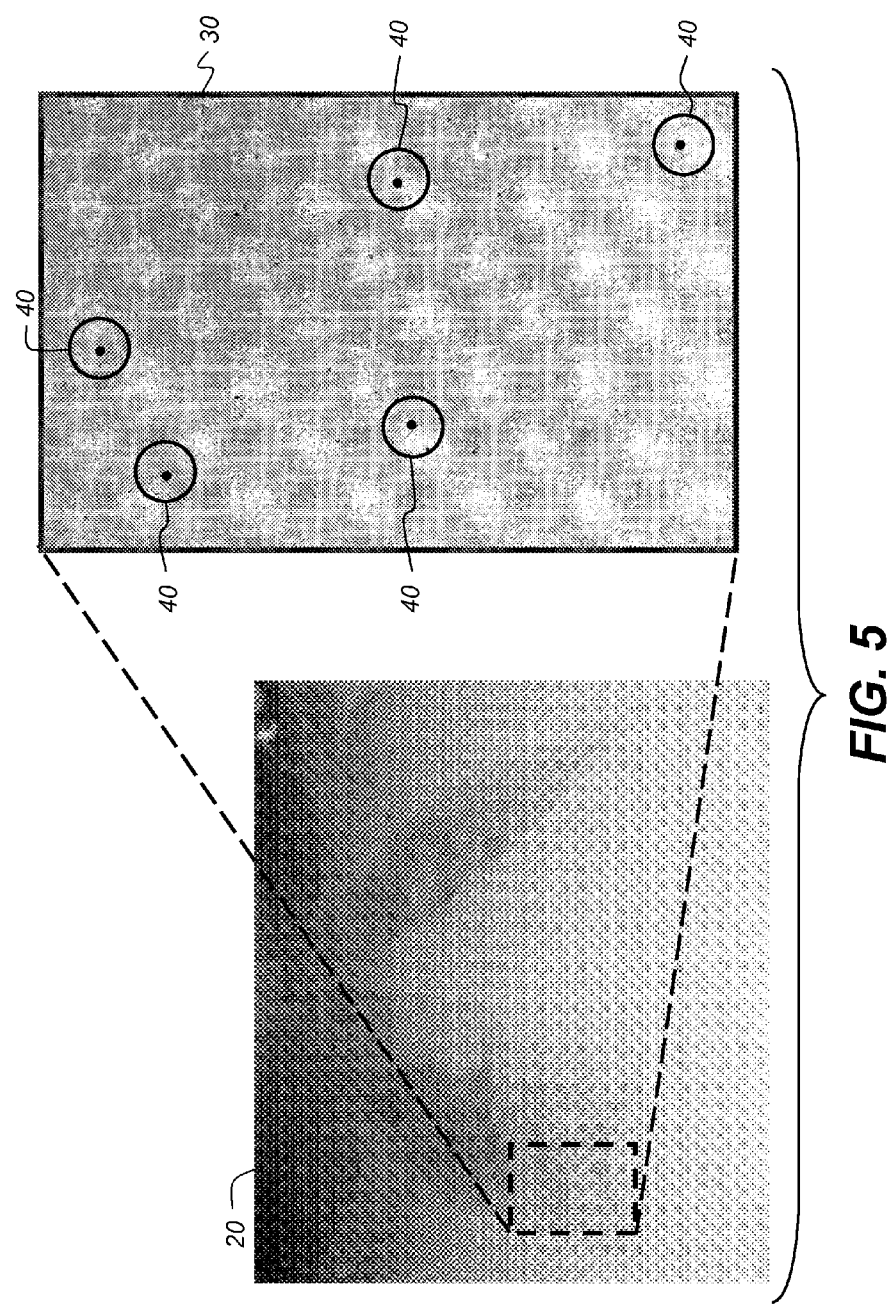

SPECKLE REPORTING IN DIGITAL RADIOGRAPHIC IMAGING

FIELD OF THE INVENTION

This invention relates to radiological imaging and to detecting and reporting of image quality for a digital radiological image.

BACKGROUND OF THE INVENTION

In the conventional workflow for digital radiological imaging, an x-ray operator or technician may routinely check the obtained images to determine whether or not the image appears to have been properly captured and to show the required portions of patient anatomy for a particular exam. Typically, a reduced-size image is reviewed on a low- to medium-resolution display monitor for this function. With many systems, the full-resolution image may alternately be available for review by the x-ray operator, a portion at a time, with additional operation steps. For example, clicking a zoom button on the capture console can invoke a pan function that allows the x-ray operator to navigate through the entire high-resolution image, section by section. However, this type of painstaking review can be quite time-consuming and is, therefore, rarely conducted in practice. Instead, the operator views the reduced-scale image, observes overall image appearance without detailed image quality assessment, and either approves the image for forwarding to the radiologist or requests a re-take. Upon approval, the full-resolution image is then stored for later assessment by a radiologist. Often, however, image quality problems overlooked by the x-ray operator or not readily visible to the operator are identified by the radiologist, hours or days afterwards.

In this conventional workflow, the initial review by the x-ray operator based on the reduced-size image is subjective and provides only a coarse estimation of the image quality and overall anatomy position. Timing and workload pressures tend to worsen the problem. It would be useful to have more information about image quality available to the operator at this stage in the radiology image processing workflow. If, for example, the operator were able to easily determine that there were an image quality problem that might compromise diagnosis, appropriate steps could be taken to re-capture the image during the same examination session. The patient and imaging personnel would not be required to schedule another examination session if problems with image quality could be detected at this initial review stage.

One problem of particular interest for Computed Radiography (CR) imaging systems relates to image speckle. Speckle is one type of image noise that occurs due to the inherent sensitivity of the CR storage phosphor plates used for x-ray image capture. The storage phosphor plates receive and accumulate incident ambient radiation during the time between imaging sessions. Such ambient or environmental radiation includes cosmic rays, X-rays emitted from nearby X-ray sources, and trace radiation sources. It can even include radiation from the CR phosphor plate itself and from its surroundings. Recommendation can be made to erase the CR phosphor plates more frequently, however some residual amount of speckle is still possible.

At the reduced-size display resolution typically used by an operator in performing the initial review of digital radiographic images, speckle is by-and-large imperceptible. In most cases, speckle can only be detected in the full-resolution digital image that is reviewed at a later time by the radiologist.

Thus, it would be useful to have utilities available for speckle detection at an earlier time in the radiographic imaging workflow.

SUMMARY OF THE INVENTION

It is an object of the present invention to address the need for speckle detection. According to one aspect of the present invention, there is provided a method for reporting image quality comprising steps of obtaining a digital radiological image; processing the image to detect at least one speckle by estimating noise signal magnitude in the digital radiological image and identifying the at least one speckle according to its signal magnitude relative to the noise signal estimate; and reporting the at least one speckle detected in the image.

It is a feature of the present invention that it provides utilities for reporting the relative amount of speckle in a radiographic image that is obtained from digital receivers. It is an advantage of the present invention that it provides an adaptable tool for speckle detection and reporting.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 5 shows another image having perceptible speckle content.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Embodiments of the present invention address the problem of image speckle in digital radiographic imaging. The term "speckle" is used as a general term for this imaging anomaly in which individual "speckles" are clearly visible. As noted earlier in the background section, image speckle is one component of the image noise for CR. However, as is described in more detail subsequently, speckle has somewhat more pronounced energy or signal magnitude and more well-defined spatial characteristics than image noise in general. Because of this, at least some amount of speckle can be detected and measured as a distinguishable component of the image noise content. Embodiments of the present invention can apply a number of techniques for differentiating speckle from other low-level "white noise" in a radiological image and generally apply a threshold-based evaluation for determining a relative amount of speckle in the image. One strategy applied in these embodiments for determining the amount of speckle first processes the image to isolate the background noise from the meaningful diagnostic image data content, then normalizes the noise content, as subsequently described in detail.

Figure 1:
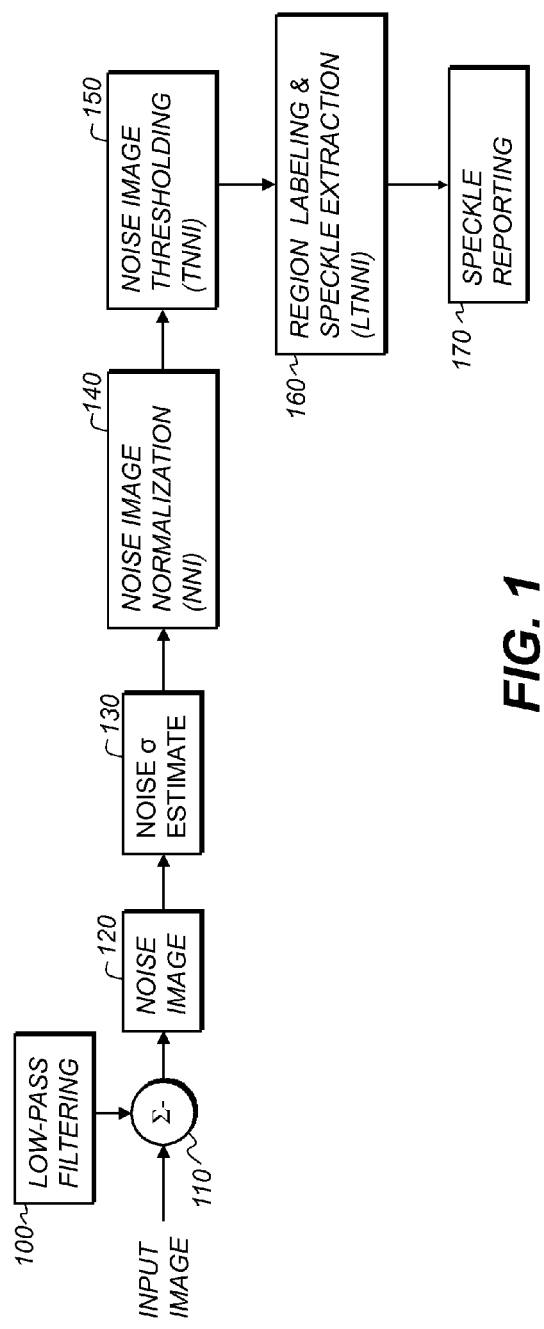
FIG. 1 is a logic flow diagram showing steps for speckle detection and reporting in some embodiments of the present invention.

Referring to FIG. 1, there is shown a logic flow diagram for an algorithm that can be used for speckle detecting and reporting in one embodiment. The algorithm begins with noise signal estimation. This is accomplished by a low-pass filtering step 100 that processes the input image using any of a number of types of low-pass filter, such as Gaussian, median, or other filter, applying image filtering techniques that are well known in the art. As a practical consideration, the filter kernel size is chosen to exceed the size of the largest speckle feature to be detected in the image. Otherwise, inadvertent filtering of speckle from the image could occur, defeating the purpose of this processing. A subtraction step 110 follows, in which the filtered low-pass image is then subtracted from the original input image. This generates a noise content image 120 that contains substantially all the image noise including the speckle noise component. The bulk of the diagnostic image data content is removed from this noise content image.

Figure 2:
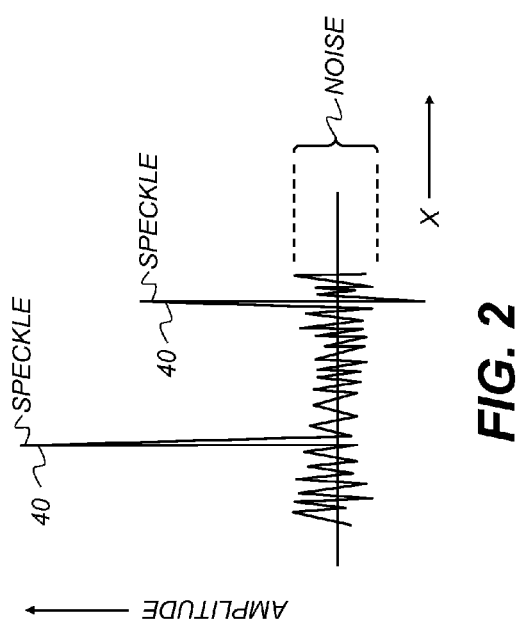
FIG. 2 is a graph showing relative noise and speckle amplitude over a line of pixels in the image.

It is instructive at this point to consider how image noise, including speckle, is typically distributed in the digital radiological image. Referring to the energy amplitude graph shown in FIG. 2, white noise is generally a low-amplitude signal. Speckle, on the other hand, exhibits a high peak energy. Two speckles 40 are indicated in this example graph. Assuming that the image noise signal magnitude follows a substantially Gaussian distribution, the present inventors found that image noise, excluding speckles, generally lies within +/−3σ of the mean pixel value, whereas speckles generally lie outside this +/−3σ region.

Back to the flowchart of FIG. 1, noise standard deviation associated with the original image exposure, excluding contributions from speckle, is estimated from the noise image 120. From visual examination of a large number of radiographic images having speckle artifacts, the present inventors found that the percentage population of the speckles relative to the total number of image pixels is usually less than 5%. Based on this information, the standard deviation ($\sigma_0$) of all the pixels in the noise image is calculated in a calculation step 130. A pixel value range is defined based on $\sigma_0$ for a standard deviation re-calculation, such that the impact from speckle signal content in the calculation would be minimized. In one embodiment of this algorithm, the range is defined at ±3$\sigma_0$. Using this value, a new standard deviation ($\sigma_{new}$) is calculated based only on pixels in the noise image whose values are within ±3$\sigma_0$. This subsequent calculation can be considered to be more computationally robust and provides a closer approximation to the average of the distribution.

Figure 3:
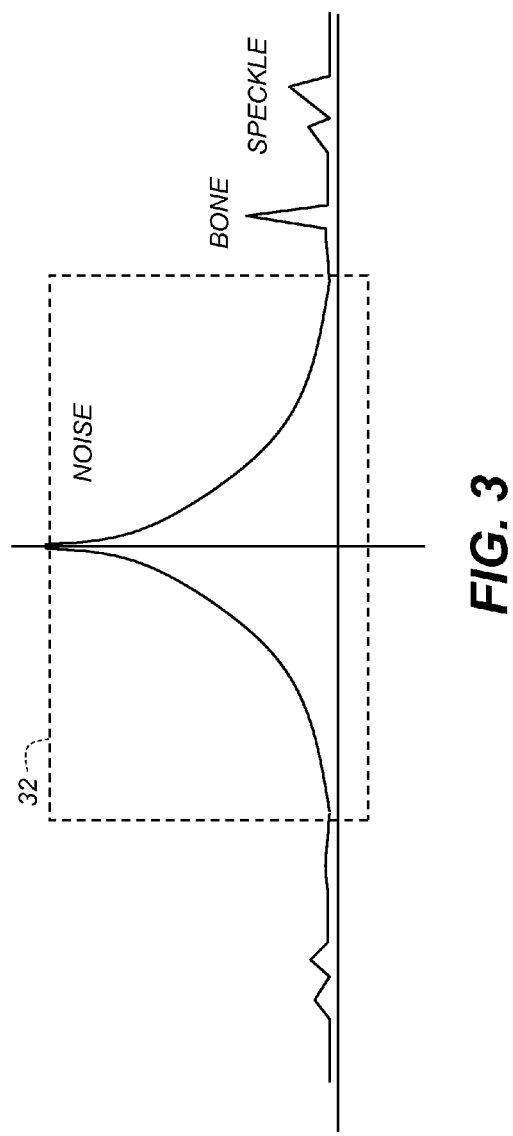
FIG. 3 is a histogram showing characteristic pixel distribution for a digital radiographic image.

The graph of FIG. 3 shows an example histogram of the pixel values in the noise image 120. As this graph shows, most pixel values lie near a mean value. Most of the noise is concentrated within a region 32 as shown in dashed outline. Bone and other radio-opaque structures are generally at values distributed outside this region. At least a substantial portion of speckle can be identified as having a distinctive distribution.

Figure 4:
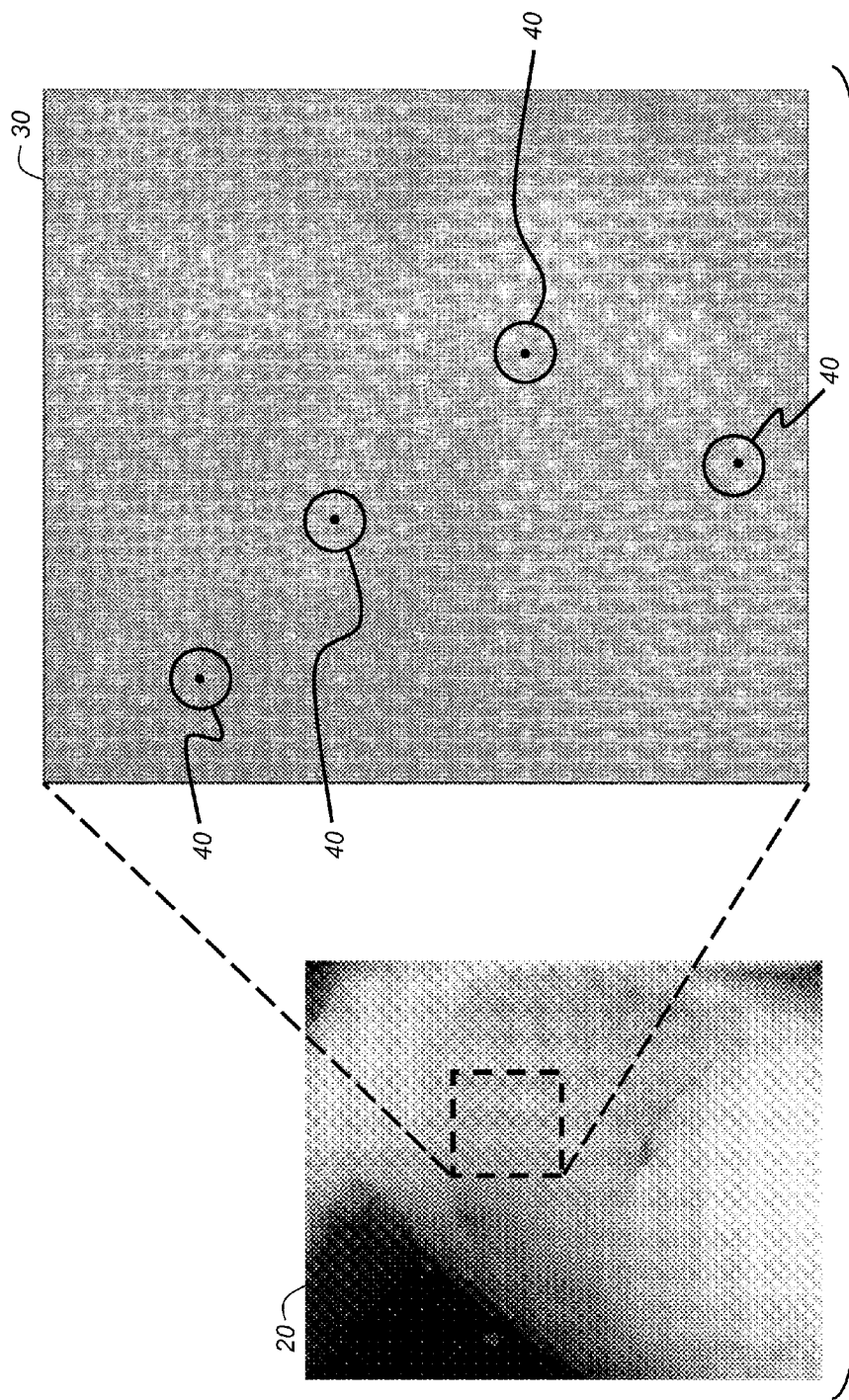
FIG. 4 shows an image having significant speckle content.

FIGS. 4 and 5 give examples of speckle that would be visible in a high resolution image 30, but not in a lower-resolution image 20. In these figures, some more pronounced speckles 40 are circled in high-resolution image 30.

It should be noted that steps 100 to 150 in FIG. 1 can be performed based on the whole image, or individually on many small sub-regions of the whole image, such as partially overlapping or non-overlapping smaller regions, in order to derive a spatially and locally adaptive noise estimate. The task of subsequent steps of the processing shown in FIG. 1 is to differentiate speckle from the balance of noise content and from skeletal and other radio-opaque structures. In a normalization step 140, the pixel value of the noise image is normalized by $\sigma_{new}$ to facilitate detection of speckle. This processing takes human visual system performance into account. There is no need to detect speckle that is below the human visual threshold; this speckle cannot be seen by radiologists for diagnostic interpretation. In an image with low exposure noise levels, the human eye can perceive speckle of very small magnitude. On the other hand, if the image exposure noise is very high to begin with, the magnitude (contrast) of the speckle must itself be very large in order to become visible to the human eye. Therefore, detection of speckles depends largely on the image exposure noise level.

The pixel value of the normalized noise image (NNI) in step 140 represents pixel fluctuation in the noise image relative to $\sigma_{new}$. In a thresholding step 150, a threshold value can be defined, such as 5σ, and applied to the NNI to extract those pixels that are speckle candidates. The thresholded normalized noise image is referred to as TNNI.

It has been found that not all the pixels in TNNI are speckles. For example, image pixels at sharp transitions between bone and soft tissue and between foreign objects such as radio-opaque hardware markers and other part of the image create some potentially false speckle indications in TNNI. It is important to distinguish and remove these false positive indications for speckle. Speckle distribution is random and speckle can be distinguished from meaningful image structures by this distribution and by the speckle size. The area of one speckle element is generally no larger than a few pixels dimension in any direction. One quantifiable characteristic of false speckle indications in TNNI is clustering, which corresponds to speckle size. Bone structure and outlines of other radio-opaque objects might appear to be speckle unless clustering is taken into account, showing that a high-energy transition between adjacent pixels is truly speckle and not meaningful imaged anatomy or foreign objects. Clusters of pixels that might otherwise appear to exhibit speckle are suspected to be false positives, particularly where they occupy a much larger region than do typical speckles.

Based on this observation, these likely false speckle pixels are removed using a technique based on region labeling in embodiments of the present invention. Region labeling, known to those skilled in the image processing arts, groups together adjacent pixels. Referring again to FIG. 1, this is performed in a region labeling step 160. Here, the threshold normalized noise image (TNNI) is analyzed so that different regions of the image can be identified and labeled, thereby forming a labeled threshold normalized noise image (LTNNI). In one embodiment, this is done simply by grouping together, under the same label, any region of mutually adjacent pixels, and by assigning different label values to different regions Connected regions in the LTNNI that have pixel population greater than the largest speckle size can then be eliminated from consideration for speckle. A logical AND operation is applied between the LTNNI and NNI to identify speckle pixels.

Parameters that can be extracted from LTNNI and NNI and used to characterize speckles with some success include the following:
 (i) Cluster size. This parameter relates to how many pixels in the original image a speckle cluster occupies, which can be readily calculated from the LTNNI. A threshold value for cluster size can be applied and can be adjusted for a radiology site in some embodiments.

(ii) Maximum signal magnitude. Maximum magnitude is defined as the maximum pixel value in magnitude in the NNI of a speckle cluster.
(iii) Spatial location. This gives the center coordinates of a speckle cluster.
(iv) Overall speckle percentage population. The overall speckle percentage population is the percentage of speckle pixels relative to the total number of image pixels.

Thus, speckle within the radiographic image can be reported to the user in term of each cluster size, maximum magnitude, spatial location, and the overall percentage population. Speckle in the image can also be reported to the operator by displaying, for example, color highlighted regions and displaying the image with highlighted speckles. Often when a reduced-size image is reviewed by the x-ray operator, small speckles may not be visible because of image size downsampling. To overcome this problem, the detected speckles at one or more locations can be "repainted" or color-highlighted within the reduced-size displayed image so that such speckles are not mistakenly ignored and all the speckles are shown to the x-ray operator for decision making. Referring again to FIG. 1, this can be reported in a speckle reporting step 170. Further, the speckles can be color coded based on their magnitude, such as red color speckles meaning larger speckle magnitude than that of blue color speckles.

In practice, not all speckles have the same impact on image diagnostic quality. The level of sensitivity of speckle impact can be reduced if the speckle is located near the periphery of the image or is of small maximum magnitude, or if there is a small speckle percentage population, for example. Based on these factors and considerations, in addition to reporting the speckle size, location and magnitude information, a rating score can be defined and displayed for each identified speckle area as part of speckle reporting step 170, according to cluster size, to maximum magnitude, and to spatial location, as well as to the overall percentage population. An example of this rating score is using the weighted sum of the speckle characteristics. This gives the reviewing technician an opportunity to check an image in more detail to determine if a higher level of speckle might be acceptable or whether or not some portion of the imaging session should be repeated. Using a score, a hospital or other imaging site can more easily implement policies requiring speckle below certain predetermined thresholds for radiological images obtained at that site.

A threshold test can be used to determine the relative amount of speckle in an image. Threshold values can be empirically determined as well as learned using machine learning techniques. Thresholds can be applied in a number of ways. In one embodiment, an image score is obtained according to variables (i)-(iv) given earlier. This score is then compared against one or more thresholds to determine what speckle results are reported to the operator. Results can be reported and displayed to the operator with terms such as Pass/Fail, Alert, Warning, Acceptable, and Poor, for example. The threshold can also be configured differently for different exam types, for different radiology sites, or for different institutions.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the logic processing for speckle detection could allow entry and editing of operational parameters specific for a site. Executable software for speckle detection and reporting could be designed using machine-learning principles, so that a radiological imaging site could effectively teach the software what levels of speckle detection are needed or are of interest at that site. Other methods than the noise image subtraction and estimation shown in the logic flow of FIG. 1 could be used for speckle detection.

Thus, what is provided is an apparatus and method for speckle detection and reporting in digital radiographic imaging.

PARTS LIST

20. Lower-resolution image
30. High-resolution image
32. Region
40. Speckle
100. Low-pass filtering step
110. Subtraction step
120. Noise image
130. Calculation step
140. Normalization step
150. Thresholding step
160. Region labeling step
170. Speckle reporting step

The invention claimed is:
1. A method for reporting image quality, using a processor, comprising:
   obtaining a digital radiological image;
   processing the image to detect at least one speckle by:
   a) estimating noise signal magnitude in the digital radiological image; and
   b) identifying the at least one speckle according to its signal magnitude relative to the noise signal estimate by normalizing speckle magnitude to the noise estimate; and
   reporting the at least one speckle detected in the image.
2. The method of claim 1 wherein estimating noise signal magnitude is performed based on a plurality of sub-regions of the digital radiological image.
3. The method of claim 1 wherein reporting the at least one speckle further comprises displaying a computed score.
4. The method of claim 1 wherein reporting the at least one speckle comprises displaying a message.
5. The method of claim 1 further comprising region labeling to remove anatomy or foreign object structure from processing.
6. The method of claim 1 wherein estimating noise signal magnitude further comprises applying a low-pass filter to the radiological image.
7. The method of claim 1 wherein reporting the at least one speckle comprises highlighting one or more speckles in a displayed image.
8. A method for reporting image quality comprising:
   obtaining a digital radiological image from a computed radiography receiver;
   filtering the image to remove lower-frequency content and retain higher-frequency content;
   identifying at least one speckle location in the higher frequency content by normalizing the speckle magnitude; and
   displaying the image and highlighting the at least one speckle location in the displayed image.
9. The method of claim 8 including highlighting one or more speckle locations by adding color content to the displayed image.
10. A method for reporting image quality, using a processor, comprising:
    obtaining a digital radiological image;

processing the image to detect a relative amount of speckle by:
a) applying a low-pass filter to the image data and subtracting low-frequency image content to obtain a resultant noise content image;
b) estimating noise in the noise content image by computing a standard deviation of noise within the noise content image and normalizing noise content according to the computed standard deviation; and
c) identifying the relative amount of speckle according to the noise estimate; and
reporting the relative amount of speckle detected in the image.

11. The method of claim 10 wherein reporting the relative amount of speckle further comprises displaying a computed score.

12. The method of claim 10 wherein reporting the relative amount of speckle comprises displaying a message.

13. The method of claim 10 further comprising region labeling to remove anatomy or foreign object structure from the noise content image.

14. The method of claim 10 wherein identifying the relative amount of speckle further comprises identifying clusters of adjacent pixels.

15. The method of claim 10 wherein reporting the relative amount of speckle comprises highlighting one or more speckle locations in a displayed image.

16. The method of claim 10 further comprising:
defining a threshold value related to speckle level;
applying the threshold value to the normalized noise content; and
extracting pixels that are speckle candidates.

17. The method of claim 10 further comprising recomputing the standard deviation using only pixel values within a limited range.

* * * * *